United States Patent Office 2,877,539
Patented Mar. 17, 1959

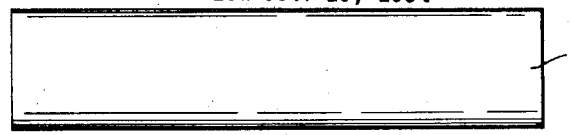
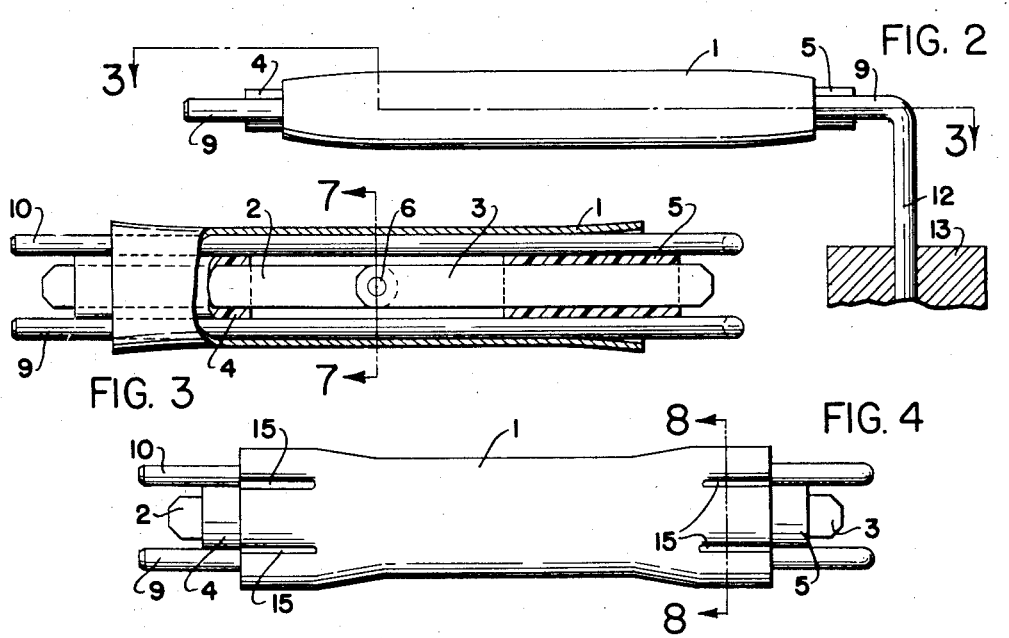
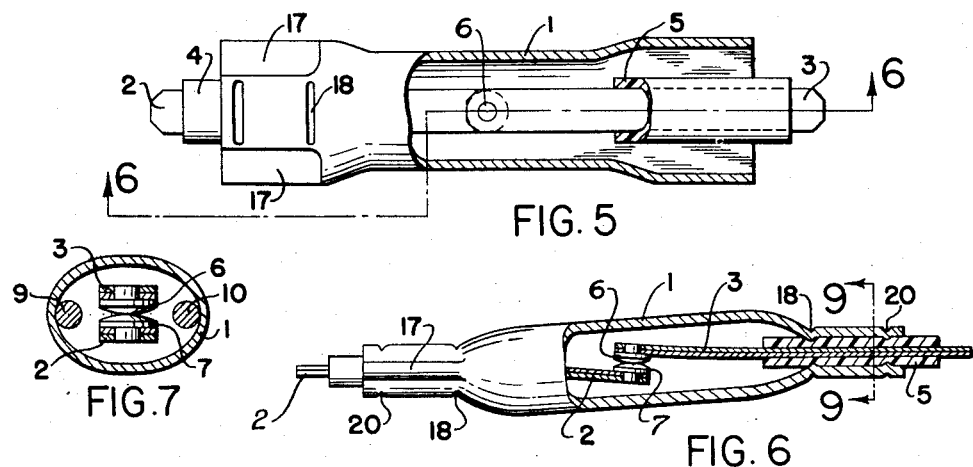
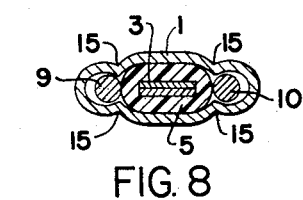
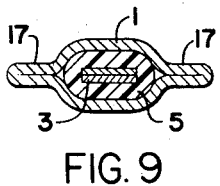

2,877,539

METHOD OF MAKING THERMOSTATS

Walter E. Kinnan, Munroe Falls, Ohio, assignor to George Franklin Dales, Akron, Ohio Application October 19, 1954, Serial No. 463,145

3 Claims. (Cl. 29—155.5)

This invention relates to a method of assembling small thermostats which are formed of a tubular casing and two bimetallic means held in the opposite ends of the casing by insulation. The bimetallic means extend through the respective insulations inwardly. Each extends inwardly from its insulation, and they overlap at approximately the longitudinal center of the casing.

It is difficult to assemble the bimetallic means in casings. The casings are metallic, and are, for example, an inch to two or three inches in length. They may measure a quarter to a half inch in width. Generally, they are not as high as they are wide. The tubing from which the casings are made may be circular, rectangular, or oval in cross section. Because the casing is a conductor of electricity, the bimetallic means must be located in the casing away from its walls so that as the bimetallic means move in response to changes in temperature, they do not contact the wall of the casing or come so close thereto as to form a short. The underwriters' specifications for certain thermostats of this type require the thermostats to stand up under a voltage differential of 1300 volts. In any small thermostat that will stand up under this test, the bimetallic means must be located centrally of the casing and away from its walls.

According to this invention spacing means is located temporarily in the casing on the two sides of the bimetallic means. The spacing means may be inserted in the casing either before or after the bimetallic means. The ends of the casing are separated from the respective bimetallic means by insulation which preferably surrounds the bimetallic means. When the bimetallic means have been properly positioned in the casing with the spacing means maintaining them in proper alignment, the casing is bent to hold the bimetallic means in position at least temporarily. This may be done by flattening its ends. Also, the top and bottom of both ends may be indented by continuous or discontinuous lines on opposite sides of the insulations, i. e. between them and the spacing means, in order to prevent lateral movement of them within the casing and thus prevent disalignment of the bimetallic means.

After the bimetallic means are thus temporarily held in alignment, the spacing means are removed from the casing. Then the two sides of the ends of the casing, on opposite sides of the insulations, are squeezed substantially flat with the inner edges of the squeezed portions adacent the edges of the insulations. This prevents their lateral displacement. At the same time the central portions of the casing are staked a short distance from the ends thereof, to give pivotal lines about which the respective ends of the casing may be flexed during calibration of the thermostat. This prevents longitudinal displacement of the bimetallic means which would disarrange their overlapped ends. Thus the bimetallic means are permanently aligned and fastened in the casing. Any satisfactory type of bimetallic means may be employed. There may be a button at the inner end of one or both of the bimetallic means to provide better electrical contact between them. The bimetallic means may include monometallic spring means and this monometallic means may carry the current. In this case a bimetallic element may be held in the insulation adjacent the spring means to move the same into or out of contact with the other bimetallic means. Alternatively, a bimetallic element may carry the current and monometallic spring means may be used to give it the proper movement. As a further alternative, a bimetallic element may be used alone.

The invention will be further described in connection with the accompanying drawings, in which—

Fig. 1 is a plan view of the empty casing after it has been cut from a length of tubing;

Fig. 2 is an elevation showing the casing supported over spacing means;

Fig. 3 is a section on the line 3—3 of Fig. 2;

Fig. 4 is a plan view of the thermostat after being staked to prevent disalignment of the insulation and bimetallic means;

Fig. 5 is a plan view (partly broken away) of the thermostat after the ends of the casing have been staked crosswise at the insulation to facilitate calibration of the thermostat;

Fig. 6 is a section partly broken away on the line 6—6 of Fig. 5; and

Figs. 7, 8 and 9 are sections on the lines 7—7, 8—8 and 9—9 of Figs. 3, 4 and 6, respectively.

The thermostat includes the casing 1, the bimetallic means 2 and 3, the insulations 4 and 5 between the bimetallic means and the respective ends of the casing. The buttons 6 and 7 provide the proper contact within the thermostat.

The casing is a section of metal tubing. The metal is a conductor of both heat and electricity. It may be copper, steel, etc.

As illustrated, the spacers 9 and 10 are the horizontal portions of pins which are bent vertically at one end to form the portions 12 which are embedded in the block 13 which may be fastened in the work table.

In assembling the thermostat the casing 1 may be first slipped over the two spacers 9 and 10 before the two bimetallic means (with one end of each properly covered with insulation) are inserted in its opposite ends, or, alternatively, the bimetallic means 2 and 3 may be inserted in the respective ends of the casing before it is placed over the spacers.

The type of bimetallic means illustrated in the drawings includes an elongated bimetallic element, one end of which is enclosed in a tube of insulating material such as nylon, etc. The bimetallic element extends a short distance outwardly from the insulation. The insulation may be marked to insure proper placement within the casing or, alternatively, the person assembling the thermostat may rely on his judgment and experience in locating the bimetallic means the proper distance into the casing.

According to one procedure the bimetallic elements (with insulation properly affixed thereto) are first inserted in the opposite ends of the casing until their inner ends overlap to just the extent required to have the buttons 6 and 7 make the proper contact. Then the casing is slipped over the spacers. The spacer 9 is against one wall of the casing and the spacer 10 against the opposite wall, the two spacers straddling the bimetallic means. The various elements are of such a size that the spacers, although fitting rather loosely, fill the spaces between the opposite walls of the casing and the sides of the insulations 4 and 5 sufficiently so that after staking at 15 (as will be explained) the bimetallic means are held in alignment.

Before removing the spacers the bimetallic means are temporarily fastened in the casing in the proper alignment. This is done by flattening the ends of the casing somewhat, and by staking both the top and bottom of the casing at 15 alongside of the insulation. As illustrated in Fig. 8, the stakes prevent lateral displacement of the bimetallic means.

Both sides of both ends of the casing are now flattened to form the surfaces 17 where the spacers were located (see Fig. 9). The casing in squeezed up against the sides of the insulations so as to prevent their subsequent lateral displacement within the casing. This obliterates the stakes 15.

The dimensions of the thermostat are so small that any lateral displacement of the bimetallic members within the casing would make a short between the bimetallic means and the casing at voltages below those attainable when the bimetallic means are properly aligned. In order to produce the proper alignment, the sides of the insulations are of appreciable length and are parallel to the center line of the bimetallic means. Thus, alignment of the insulations aligns the bimetallic means.

The thermostat is calibrated by bending the ends of the casing to bring the buttons 6 and 7 into light contact at the temperature at which the thermostat is to be operated. Fig. 6 illustrates the thermostat after calibration. To facilitate bending the ends of the thermostat during calibration the top and bottom of the casing are advantageously staked at 18. Instead of using continuous depressions at 18, a series of depressed dots or the like may be employed.

The ends of the casing are advantageously also staked at 20 to make sure that the insulation will not be moved longitudinally within the casing. The staking 20 is optional.

In the finished thermostat the bimetallic means are held in place longitudinally by stakings 18 and 20 which lie across the thermostat or by other suitable means which need not deform the inner surface of the casing but flattening the ends of the casing by clamping means which deforms the inner surface and embeds small areas of it in the insulation will generally be desirable. The lateral stakings 15 hold the insulation in alignment only temporarily. After the edge areas 17 of the ends of the casing have been flattened, as clearly illustrated in Figs. 5 and 9, the stakings 15 are relatively ineffective, if not entirely effaced.

As illustrated in Fig. 3, there is no contact between the bimetallic means and the spacers. Thus, spacers which extend only the length of the insulation will be equally effective with spacers which extend from one end of the casing to the other, as illustrated, such shorter spacers may be moved in and out of both ends of the casing. One advantage of the shorter spacers is the ease with which they can be removed from the casing.

The invention is defined in the claims which follow.
What I claim is:

1. In the manufacture of a thermostat from a tubular metal casing with narrow bimetallic means in each of the open ends thereof, with one end of each bimetallic means and insulation therefor being loosely located in the respective ends of the casing with the insulation situated between the respective bimetallic means and the wall of the casing at each end thereof, with each bimetallic means extending inwardly from its insulation and overlapping at substantially the longitudinal center of the casing, the bimetallic means and insulation being centered laterally of the casing by removable spacing means located on both sides thereof to space the same laterally from the walls of the casing, the steps which comprise pressing the ends of the casing against the respective insulating means in order to prevent displacement thereof with respect to the casing, removing the spacing means without changing the relative positions of either insulating means or either bimetallic means with respect to the casing, and then flattening the portions of the casing where the spacing means were located so as to prevent subsequent lateral displacement of either bimetallic means within the casing.

2. In the manufacture of a thermostat with a tubular casing in which two narrow bimetallic means overlap at substantially its longitudinal center while being held respectively by insulation in the ends of the casing, the steps which comprise aligning the bimetallic means in the casing by locating removable spacing means on opposite sides thereof within the casing, then removing the spacing means while holding the bimetallic means in this position, and then flattening the portions of the ends of the casing previously occupied by the spacing means close along both sides of the respective insulations to prevent subsequent disalignment of the bimetallic members in the casing because of lateral displacement of either insulation therein.

3. The manufacture of a thermostat from two narrow bimetallic means, two seamless insulating tubes, and a seamless tubular casing, which comprises placing the bimetallic means in the respective insulating tubes and then placing these tubes in the respective ends of the casing with the respective bimetallic means extending inwardly therefrom and overlapping at substantially the longitudinal center of the casing, also placing removable spacing means on opposite sides of the insulating tubes, squeezing the central portion of the ends of the casing onto the respective insulating tubes to hold the same against displacement while the spacing means are removed and indenting the casing adjacent both sides of each insulating tube between the insulating tube and spacing means to prevent lateral displacement of the bimetallic means and insulating tube, then removing the respective spacing means, and then flattening those portions of the ends of the casing which were occupied by the spacing means to prevent subsequent lateral displacement of the insulation and bimetallic means within the casing.

References Cited in the file of this patent

UNITED STATES PATENTS

| | | |
|---|---|---|
| 225,173 | Smith | Mar. 2, 1880 |
| 2,393,355 | Eppler et al. | Jan. 22, 1946 |